(12) United States Patent
Shirasuna

(10) Patent No.: US 7,268,811 B2
(45) Date of Patent: Sep. 11, 2007

(54) ZOOM LENS SYSTEM

(75) Inventor: Takashi Shirasuna, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 746 days.

(21) Appl. No.: 10/832,558

(22) Filed: Apr. 26, 2004

(65) Prior Publication Data

US 2004/0223070 A1    Nov. 11, 2004

(30) Foreign Application Priority Data

May 6, 2003   (JP) .............................. 2003-128264

(51) Int. Cl.
*H04N 5/262* (2006.01)
*G02B 15/14* (2006.01)

(52) U.S. Cl. ................................... 348/240.3; 359/687

(58) Field of Classification Search .......... 348/240.99, 348/240.3, 335; 396/72, 85; 359/432, 676, 359/683, 687
See application file for complete search history.

(56) References Cited

U.S. PATENT DOCUMENTS

| | | | | |
|---|---|---|---|---|
| 4,802,747 A * | 2/1989 | Horiuchi | ..................... | 359/687 |
| 5,418,646 A * | 5/1995 | Shibata et al. | ............... | 359/687 |
| 5,477,297 A * | 12/1995 | Suzuki | ........................ | 396/72 |
| 5,557,470 A * | 9/1996 | Shibayama | .................. | 359/687 |
| 5,583,701 A * | 12/1996 | Yamanashi | .................. | 359/683 |
| 5,768,029 A | 6/1998 | Morooka | | |
| 5,859,729 A * | 1/1999 | Misaka | ........................ | 359/687 |
| 5,886,828 A * | 3/1999 | Kim | ............................ | 359/687 |
| 6,101,043 A * | 8/2000 | Kohno et al. | ................ | 359/687 |
| 6,462,886 B1 * | 10/2002 | Hagimori | ..................... | 359/687 |
| 6,606,200 B1 * | 8/2003 | Nakayama et al. | ......... | 359/683 |
| 6,721,105 B2 * | 4/2004 | Ohtake et al. | .............. | 359/687 |
| 7,106,521 B2 * | 9/2006 | Hoshi | .......................... | 359/687 |
| 2003/0189763 A1 * | 10/2003 | Horiuchi | ..................... | 359/687 |

FOREIGN PATENT DOCUMENTS

| | | |
|---|---|---|
| CN | 1410793 A | 4/2003 |
| JP | 6-337354 A | 12/1994 |

(Continued)

OTHER PUBLICATIONS

Patent Office of the People's Republic of China; "Chinese Office Action" of corresponding Chinese Patent No. 200410036671X; mailed Aug. 26, 2005 (5 pages).90.

*Primary Examiner*—Lin Ye
*Assistant Examiner*—Jason Whipkey
(74) *Attorney, Agent, or Firm*—Morgan & Finnegan, LLP

(57) ABSTRACT

A zoom lens system is disclosed which includes, in order from an object side to an image side, a first lens unit, a second lens unit, a third lens unit and a fourth lens unit which have a positive, negative, positive and positive optical power, respectively, and at least the first, third and fourth lens units move during zooming so that the distance between the first and second lens units increases, the distance between the second and third lens units decreases and the distance between the third and fourth lens units decreases at the telephoto end compared to the wide-angle end. Then, by appropriately setting lens elements constituting each lens unit and focal lengths of the lens units which move during zooming, the present invention realizes high optical performance over the entire zooming range and entire image area while achieving a desired zoom ratio.

8 Claims, 11 Drawing Sheets

FOREIGN PATENT DOCUMENTS

| | | |
|---|---|---|
| JP | 8220439 | 8/1996 |
| JP | 9-184982 A | 7/1997 |
| JP | 9184982 | 7/1997 |
| JP | 2000-187161 A | 7/2000 |
| JP | 2003-107347 A | 4/2003 |

* cited by examiner

ZOOM LENS SYSTEM

BACKGROUND OF THE INVENTION

1. Field of the Invention

The present invention relates to a zoom lens system, and more particularly, to a zoom lens system which is preferably used for a video camera, digital camera, film camera and broadcasting camera, etc.

2. Description of the Related Art

With miniaturization of a single-lens reflex camera, lens shutter camera, digital still camera, video camera, etc., there is a demand for a short-length and compact zoom lens as an image-taking lens used for these cameras in recent years.

For example, Patent document 1 discloses a zoom lens made up of four lens units of positive, negative, positive, and positive refractive power, respectively with each lens unit consisting of a few lenses. This zoom lens realizes compactness and a zoom ratio (magnification-varying ratio) of ×3 or more by arranging two or more aspherical surfaces from the third lens unit onward, etc.

Furthermore, as disclosed in Patent document 2, a compact and wide-angle zoom lens having a zoom ratio of up to approximately ×3.5 is known, which consists of four lens units; positive, negative, positive and positive refractive power, realized by limiting the number of lens components of each lens unit and specifying refractive power distribution.

Patent Document 1, Japanese Patent Application Laid-Open No. H8(1996)-220439 (corresponding to: U.S. Pat. No. 5,768,029)

Patent Document 2, Japanese Patent Application Laid-Open No. H9(1997)-184982 (corresponding to: U.S. Pat. No. 5,859,729)

With regard to a zoom lens in general, it is necessary to set the lens structure of each lens unit in order to reduce the size of the entire lens system and obtain good optical performance over the entire zoom range while maintaining a desired zoom ratio. In a zoom lens, increasing the refractive power of each lens unit reduces the amount of movement of each lens unit during zooming, making it possible to shorten the total length of the zoom lens. However, simply increasing the refractive power of each lens unit will also increase a variation of aberration caused by zooming, causing a problem that it will be difficult to correct this aberration appropriately.

For many zoom lenses, it is important to make the structure of the optical system as simple as possible while maintaining high optical performance.

In the zoom lens disclosed in Patent document 1, all the four lens units are each constructed of three lenses or less and the total number of lenses is small, which makes the lens system compact. On the other hand, this zoom lens uses two or more aspherical lenses with strong refractive power made of a glass material whose manufacturing is relatively difficult. This results in a tendency to make manufacturing difficult.

The zoom lens disclosed in Patent document 2 achieves a zoom lens with four lens units having a structure with fewer lenses, but when the zoom ratio exceeds ×3, it is still necessary to use two aspherical lenses. This results in a tendency to make manufacturing difficult. Furthermore, since the first lens unit having the largest aperture in the optical system has relatively strong positive refractive power, it has a lens shape with strong curvature, which results in a tendency to make machining of lenses difficult.

In this way, in a zoom lens consisting of four lens units of positive, negative, positive and positive refractive power, in order to realize a small lens system with a high zoom ratio and fewer lenses, it is necessary to set conditions of movement of each lens unit caused by zooming and refractive power, etc., of each lens unit appropriately. Unless these are satisfied, various types of aberration will occur increasingly and it will be more difficult to obtain images of good quality over the entire zoom range.

SUMMARY OF THE INVENTION

It is an object of the present invention to provide a zoom lens having high optical performance over the entire zoom range and the entire image area by appropriately setting conditions of movement of each lens unit caused by zooming and refractive power, etc., of each lens unit while obtaining a desired zoom ratio.

A zoom lens system according to one aspect of the present invention includes, in order from an object side to an image side, a first lens unit of positive optical power, a second lens unit of negative optical power, a third lens unit of positive optical power and a fourth lens unit of positive optical power. In this zoom lens system, at least the first, third and fourth lens units move during zooming so that the distance between the first lens unit and second lens unit increases, the distance between the second lens unit and third lens unit decreases and the distance between the third lens unit and fourth lens unit decreases at a telephoto end compared to a wide-angle end. Then, the above described object is attained by appropriately setting lens elements constituting each lens unit and the focal lengths of the lens units which move during zooming.

DETAILED DESCRIPTION OF THE PREFERRED EMBODIMENTS

Embodiments of a zoom lens system according to the present invention and an optical apparatus (single-lens reflex camera) using this zoom lens system will be explained.

Figure 1:
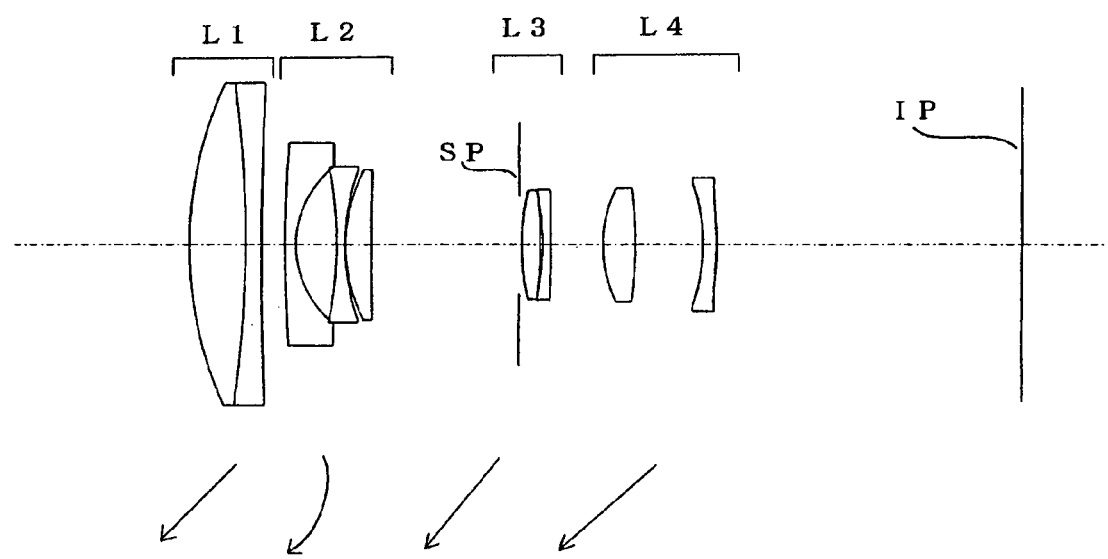
FIG. 1 is an optical cross-sectional view of a zoom lens according to Embodiment 1.
Figure 2:
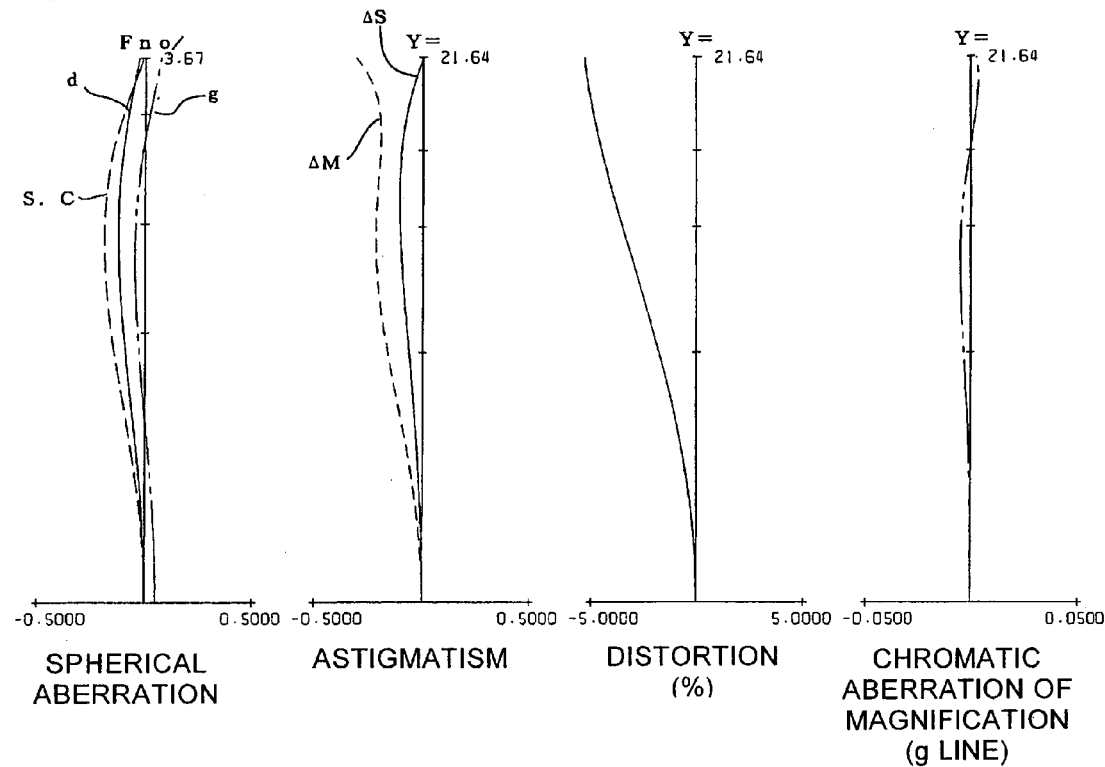
FIG. 2 is an aberration diagram of the zoom lens according to Embodiment 1 at the wide-angle end.
Figure 3:
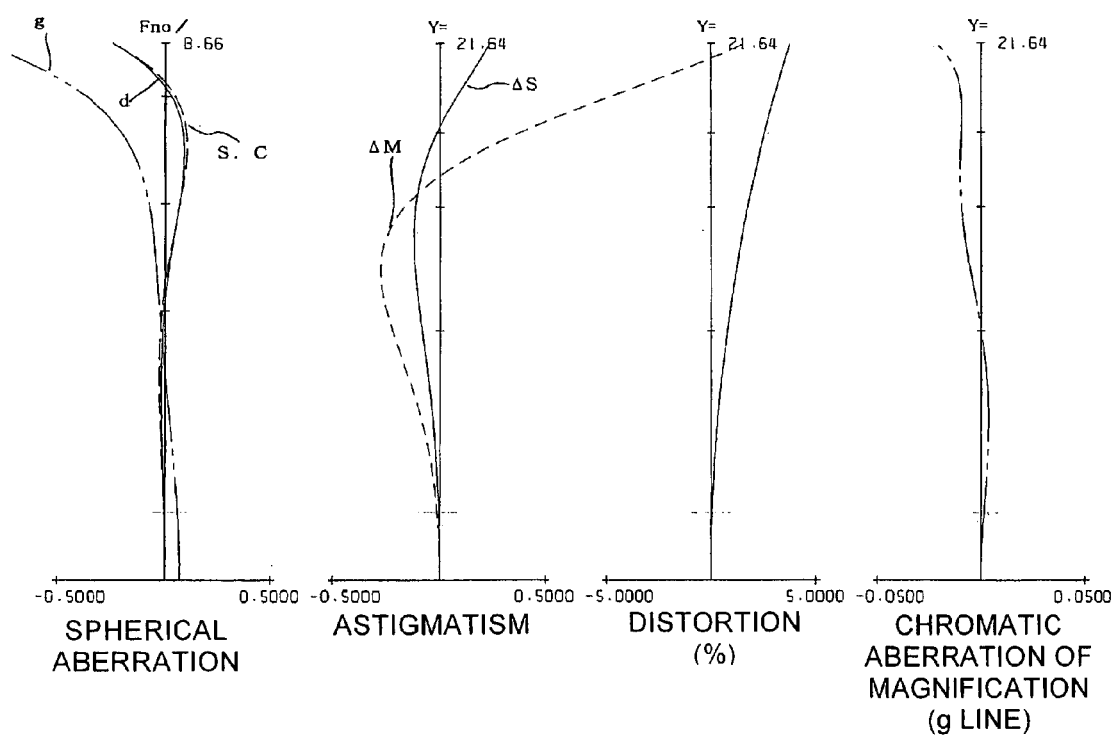
FIG. 3 is an aberration diagram of the zoom lens according to Embodiment 1 at the telephoto end.

FIG. 1 is a cross-sectional view of a zoom lens according to Embodiment 1 at the wide-angle end, and FIG. 2 and FIG. 3 are aberration diagrams of the zoom lens according to Embodiment 1 at the wide-angle end and at the telephoto end, respectively.

Figure 4:
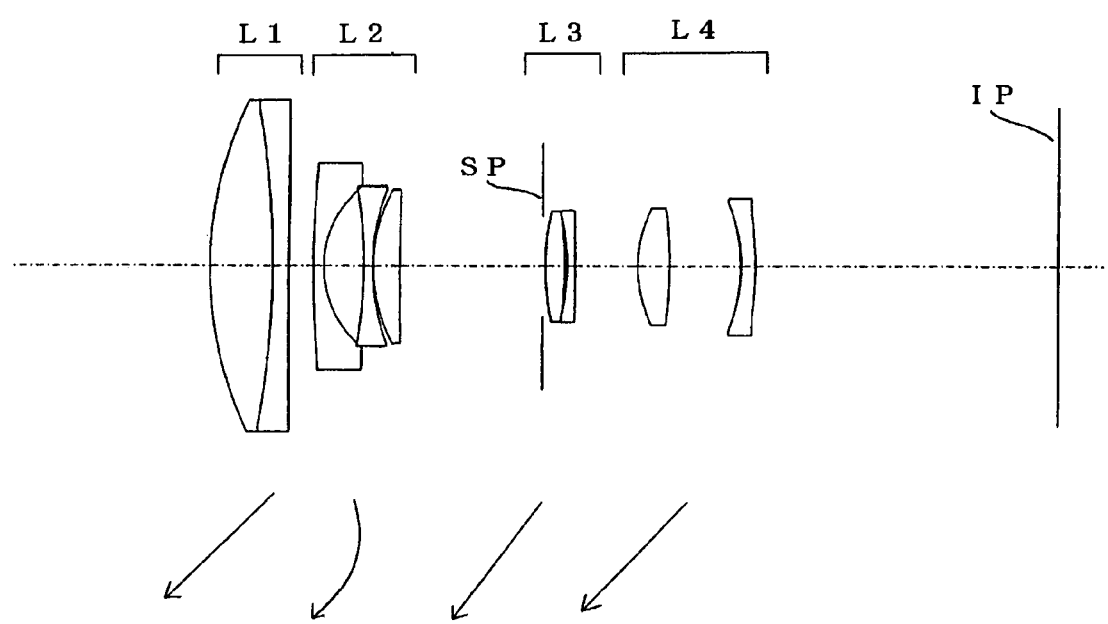
FIG. 4 is an optical cross-sectional view of a zoom lens according to Embodiment 2.
Figure 5:
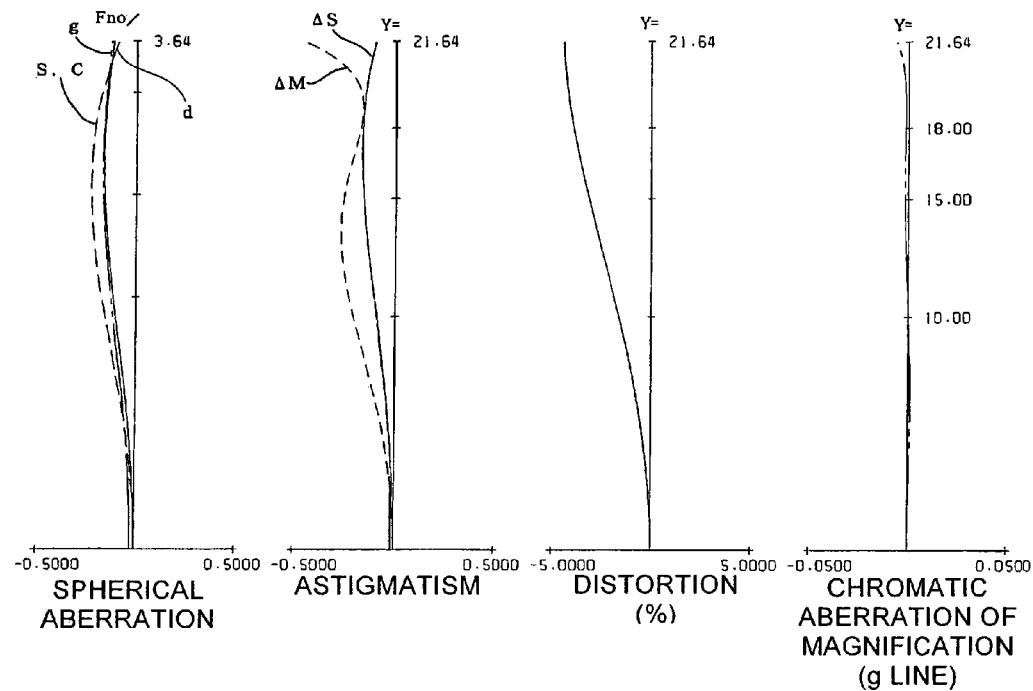
FIG. 5 is an aberration diagram of the zoom lens according to Embodiment 2 at the wide-angle end.
Figure 6:
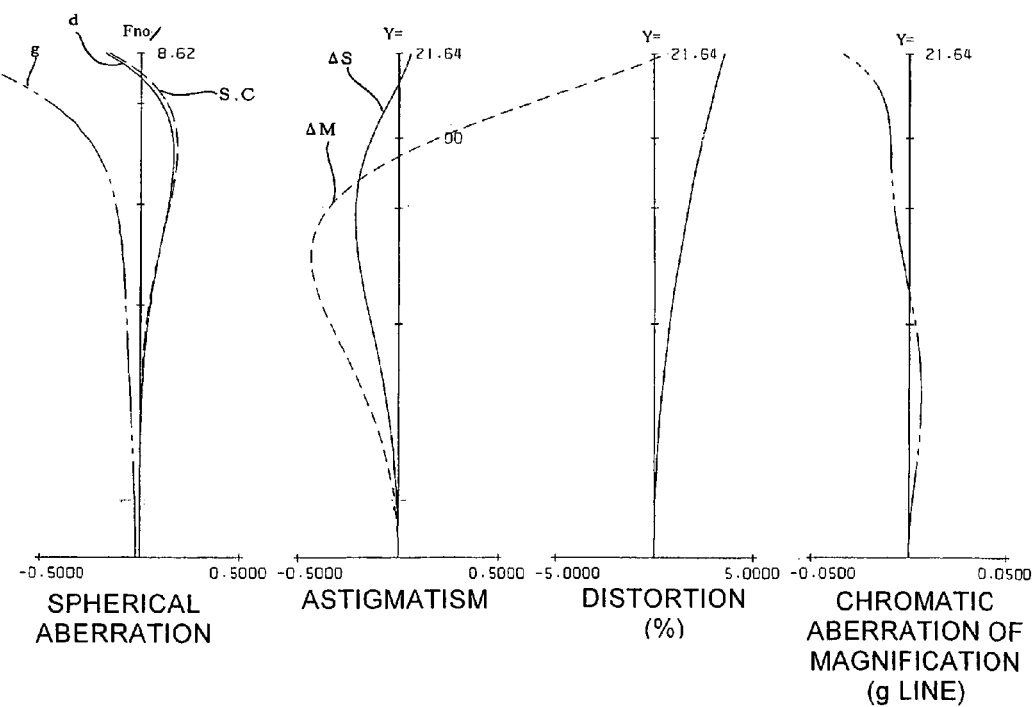
FIG. 6 is an aberration diagram of the zoom lens according to Embodiment 2 at the telephoto end.

FIG. 4 is a cross-sectional view of a zoom lens according to Embodiment 2 at the wide-angle end, and FIG. 5 and FIG. 6 are aberration diagrams of the zoom lens according to Embodiment 2 at the wide-angle end and at the telephoto end, respectively.

Figure 7:
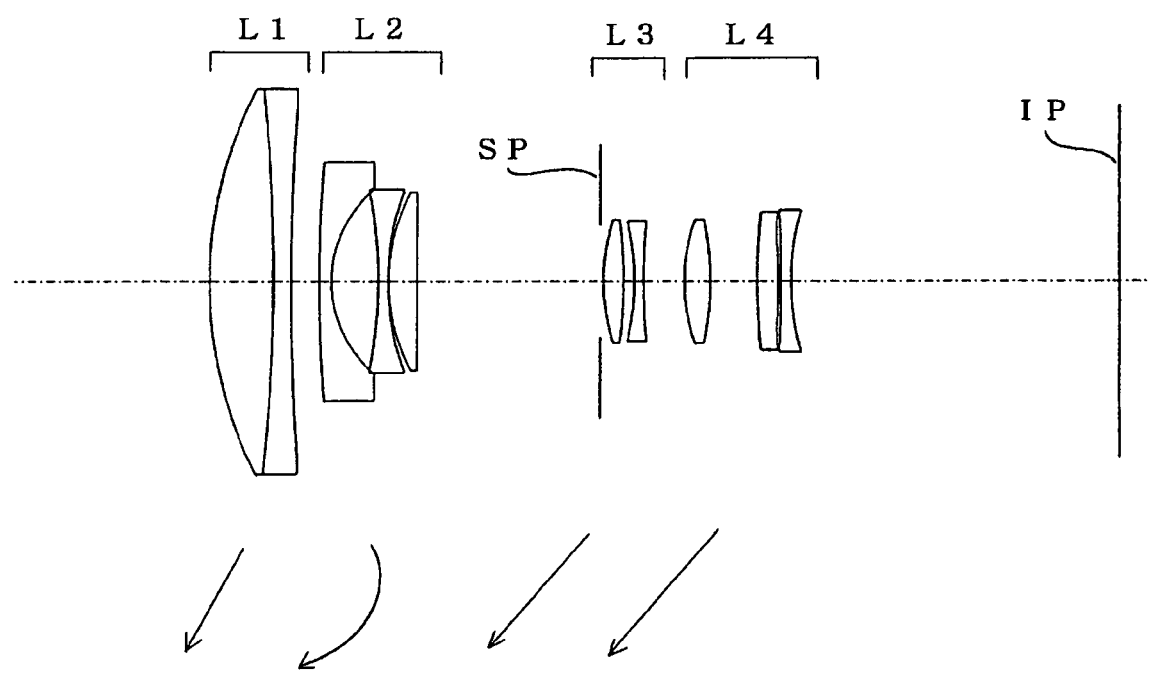
FIG. 7 is an optical cross-sectional view of a zoom lens according to Embodiment 3.
Figure 8:
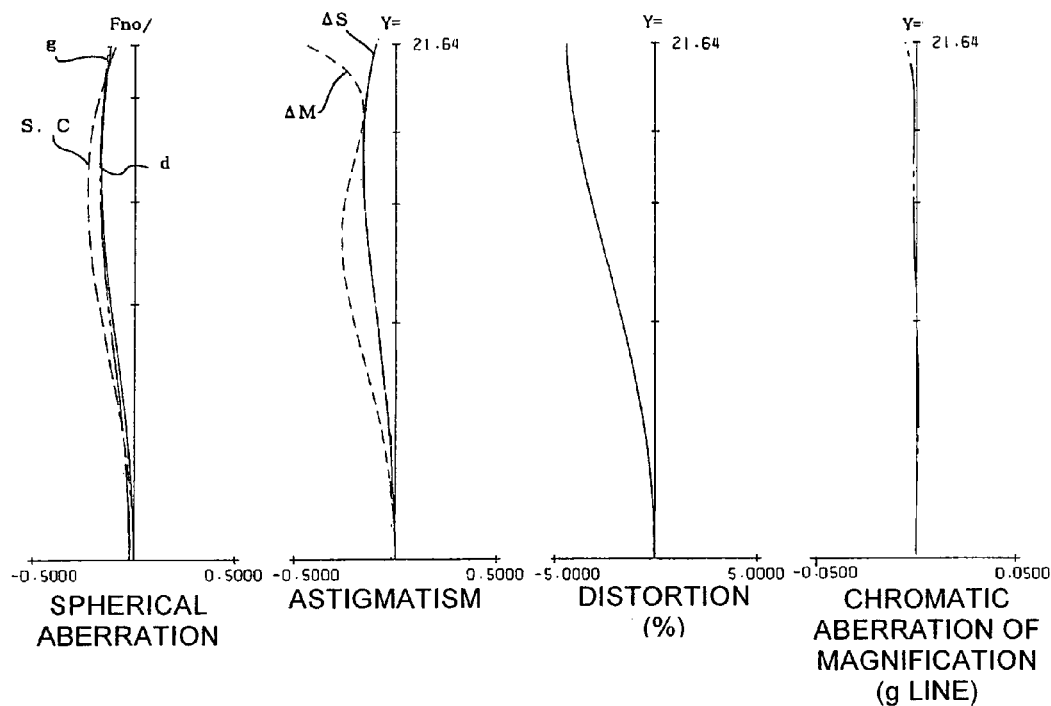
FIG. 8 is an aberration diagram of the zoom lens according to Embodiment 3 at the wide-angle end.
Figure 9:
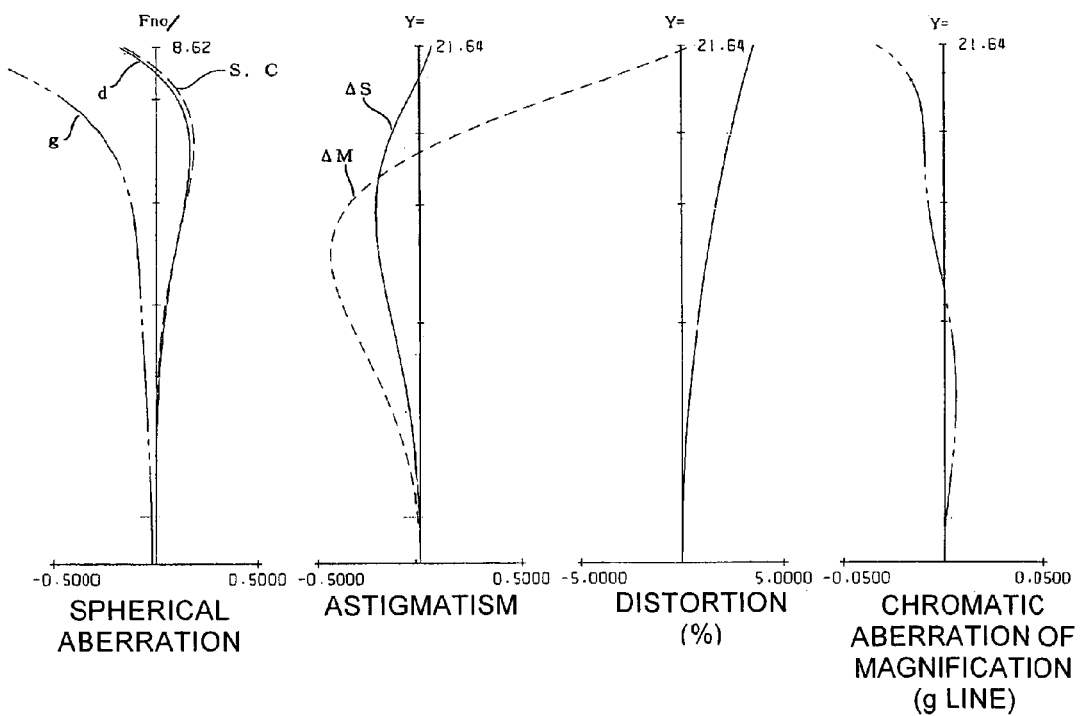
FIG. 9 is a an aberration diagram of the zoom lens according to Embodiment 3 at the telephoto end.

FIG. 7 is a cross-sectional view of a zoom lens according to Embodiment 3, and FIG. 8 and FIG. 9 are aberration diagrams of the zoom lens according to Embodiment 3 at the wide-angle end and at telephoto end, respectively.

Figure 10:
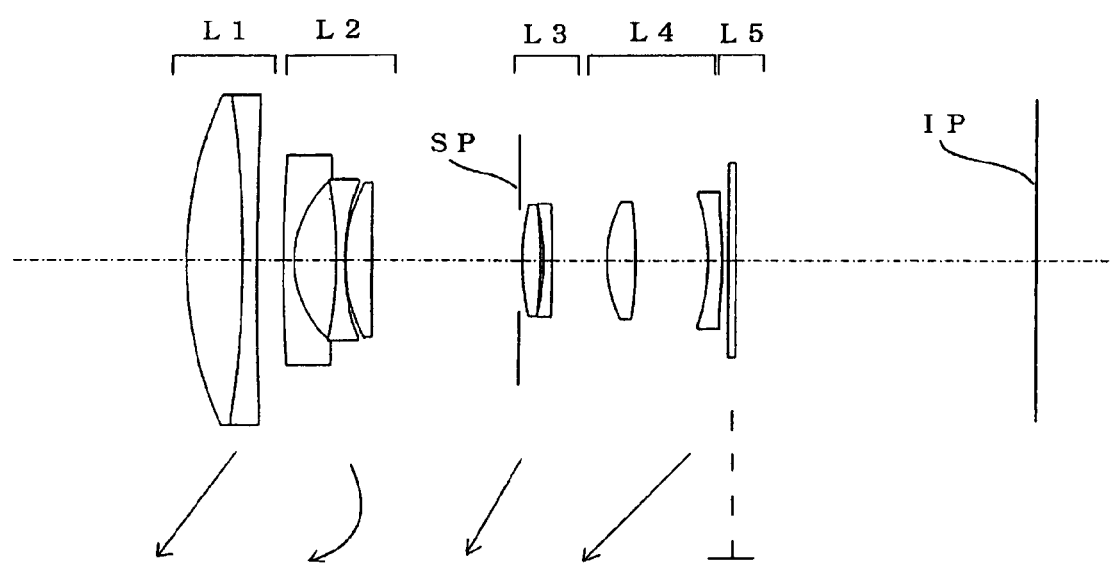
FIG. 10 is an optical cross-sectional view of a zoom lens according to Embodiment 4.
Figure 11:
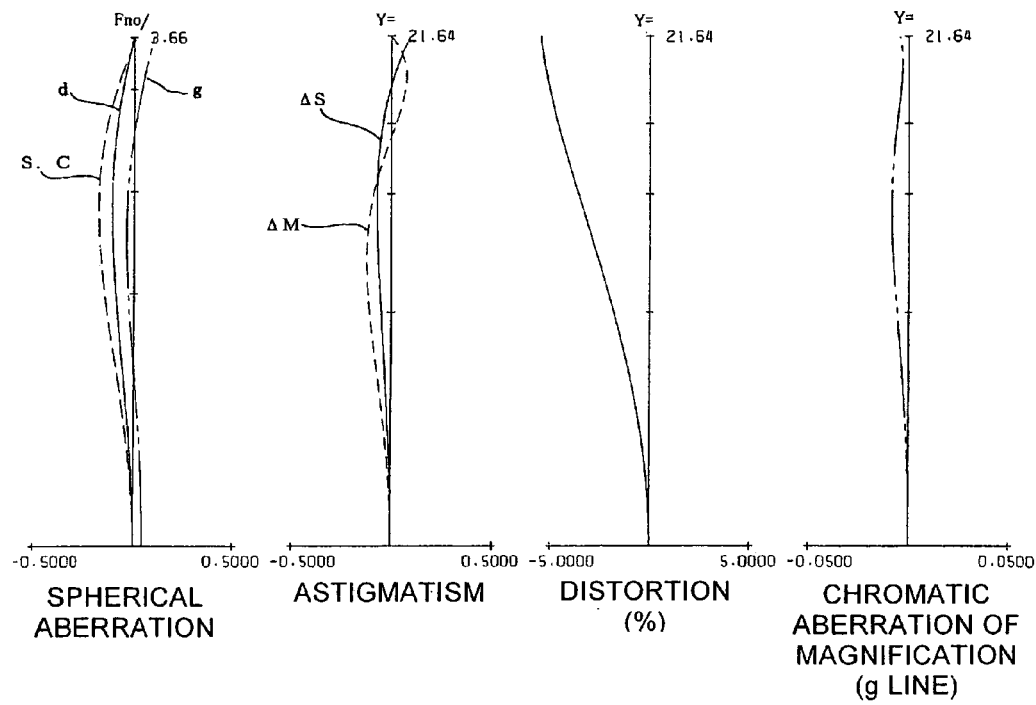
FIG. 11 is an aberration diagram of the zoom lens according to Embodiment 4 at the wide-angle end.
Figure 12:
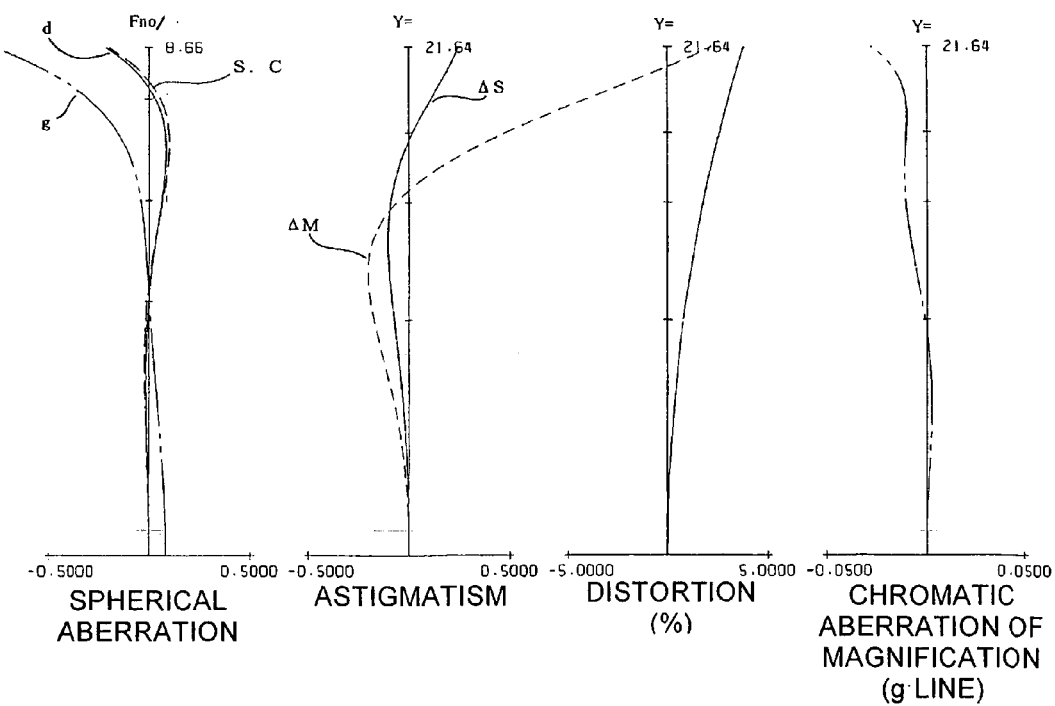
FIG. 12 is an aberration diagram of the zoom lens according to Embodiment 4 at the telephoto end.

FIG. 10 is a cross-sectional view of a zoom lens according to Embodiment 4, and FIG. 11 and FIG. 12 are aberration diagrams of the zoom lens according to Embodiment 4 at the wide-angle end and at the telephoto end, respectively.

Figure 13:
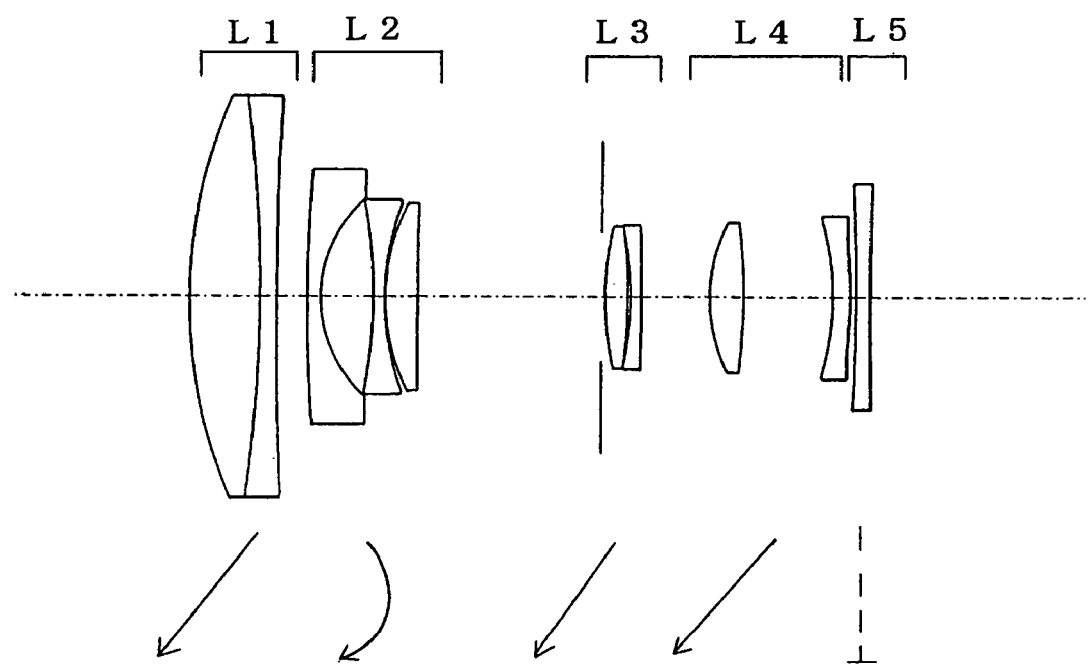
FIG. 13 is an optical cross-sectional view of a zoom lens according to Embodiment 5.
Figure 14:
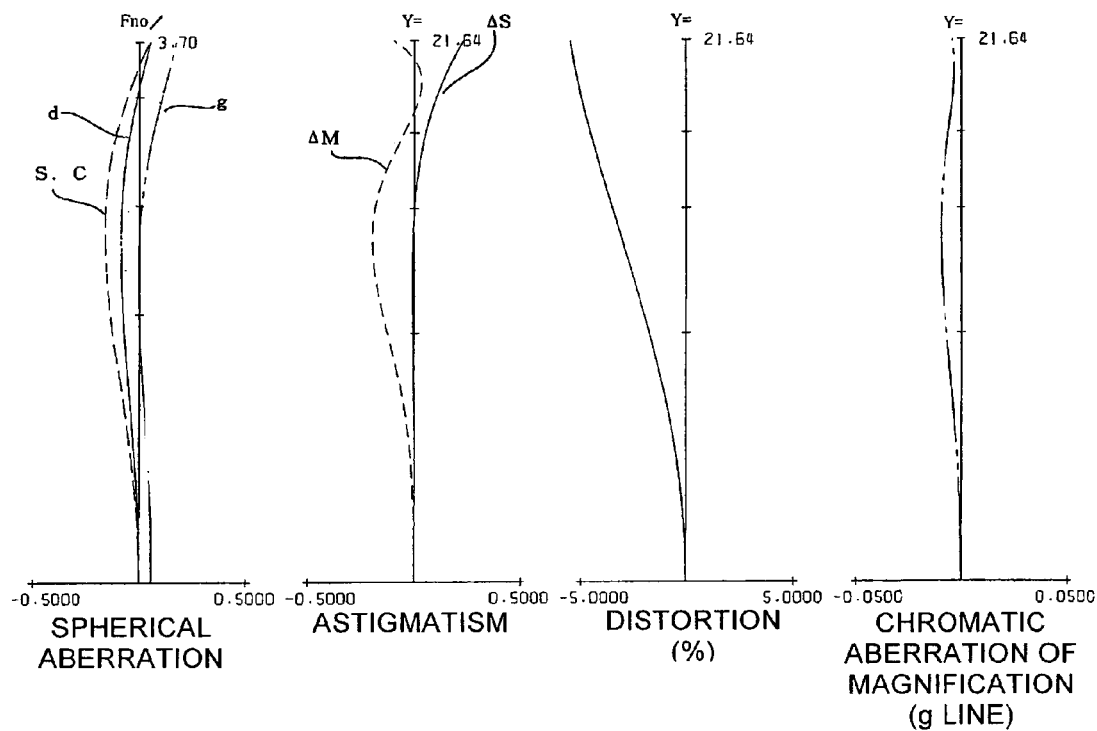
FIG. 14 an aberration diagram of the zoom lens according to Embodiment 5 at the wide-angle end.
Figure 15:
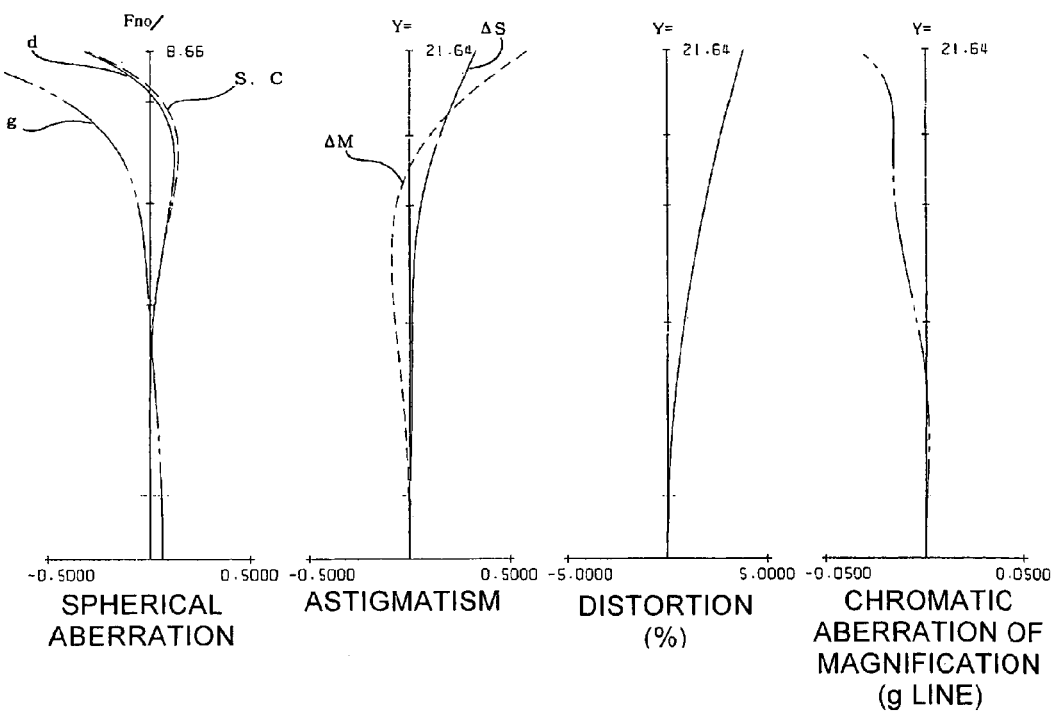
FIG. 15 an aberration diagram of the zoom lens according to Embodiment 5 at the telephoto end.

FIG. 13 is a cross-sectional view of a zoom lens according to Embodiment 5, and FIG. 14 and FIG. 15 are aberration diagrams of the zoom lens according to Embodiment 5 at the wide-angle end and at the telephoto end, respectively.

Figure 16:
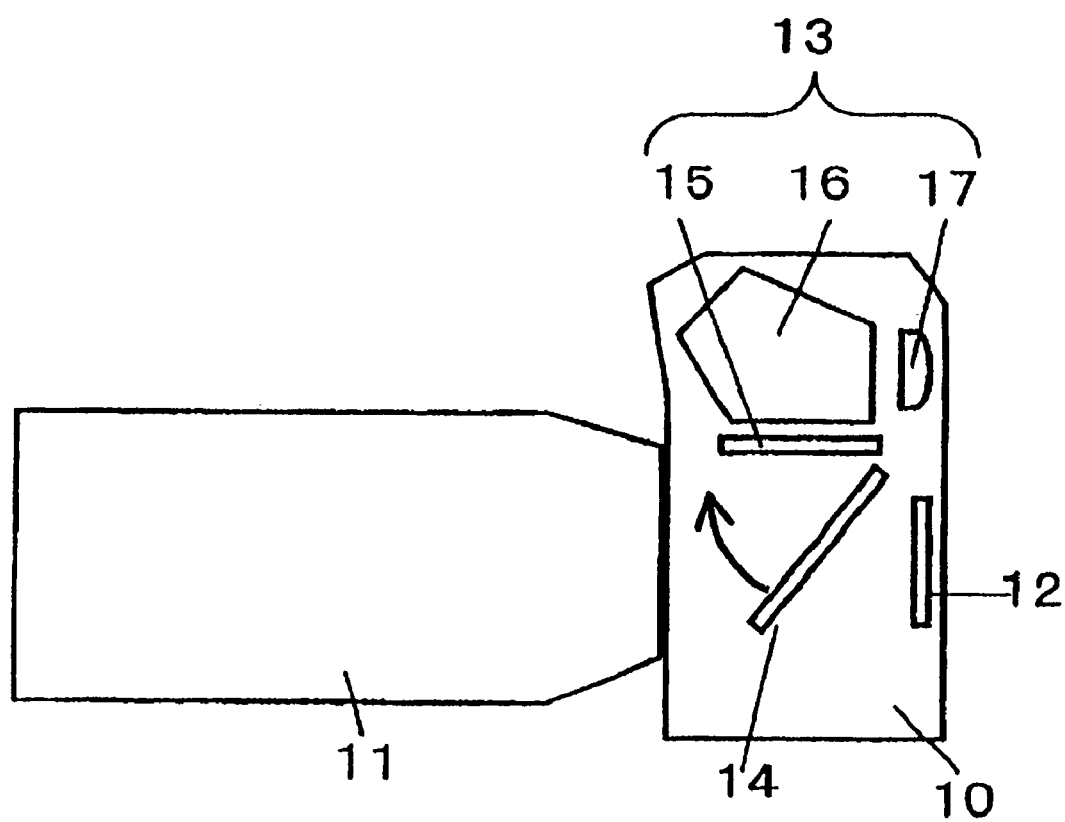
FIG. 16 is a schematic view of a single-lens reflex camera.

FIG. 16 is a schematic view of a single-lens reflex camera using the zoom lens system according to the present invention.

In the cross-sectional views of lenses shown in FIG. 1, FIG. 4, FIG. 7, FIG. 10 and FIG. 13, reference character L1 denotes a first lens unit of positive refractive power (optical power=reciprocal of focal length), L2 denotes a second lens unit of negative refractive power, L3 denotes a third lens unit of positive refractive power and L4 denotes a fourth lens unit of negative refractive power. Reference character L5 denotes a flat plate or an optical member (fifth lens unit) having an aspherical surface, and the optical member may also have positive or negative refractive power. In the zoom lens, zooming is performed by moving each lens unit toward the object side following movement tracks shown by the arrows so that the distance (axial air distance) between the first lens unit L1 and second lens unit L2 increases, the distance between the second lens unit L2 and third lens unit L3 decreases, and the distance between the third lens unit L3 and fourth lens unit L4 decreases at the telephoto end compared to the wide-angle end, and further, in Embodiments 4 and 5 in FIG. 10 and FIG. 13, so that the distance between the fourth lens unit L4 and fifth lens unit L5 increases.

More specifically, the first, third and fourth lens units L1, L3 and L4 are moved toward the object side and the second lens unit L2 is moved along part of the track which is convex toward the image side.

Reference character SP denotes an aperture stop. Reference character IP denotes an image plane on which an image-pickup plane of a solid image-pickup element such as a CCD sensor or CMOS sensor is placed when the zoom lens system of the present invention is used as an image-taking optical system of a digital camera, while a film plane is placed when the zoom lens system of the present invention is used as an image-taking optical system for a film camera.

Focusing is realized by moving the second lens unit L2 along an optical axis shown by a chain line in each figure.

In each Embodiment, the wide-angle end and telephoto end refer to the zoom positions of both ends when the magnification-varying lens unit moves from one end to the other on the optical axis, where the maximum allowable movement is determined by the mechanism of the zoom lens.

In the aberration diagrams, reference character d denotes a d-line, g denotes a g-line, S.C denotes a sine condition, $\Delta M$ denotes a meridional image plane, $\Delta S$ denotes a sagittal image plane and magnification chromatic aberration is represented by the g-line. Furthermore, reference character Fno denotes an F number and Y denotes an image height.

Then, the features of the lens structure of the zoom lens according to Embodiments 1 to 5 will be explained.

In the zoom lens according to Embodiments 1 to 5, all three lens units having positive refractive power, are moved to vary magnification and correct a variation of the image plane caused by the variation of magnification, and thereby the refractive powers are efficiently distributed and a high zoom ratio and good optical performance are achieved in a compact optical system as a whole.

Furthermore, the first lens unit L1 of positive refractive power consists, in order from the object side, of one positive lens and one negative lens cemented together. Using such a structure allows the negative lens to have a surface with a gentle curvature (large radius of curvature) compared to a structure with a negative lens followed by a positive lens, which facilitates machining of the negative lens when manufacturing. Furthermore, at this time, the positive lens whose both surfaces have convex shapes and the negative lens whose both surfaces have concave shapes are used so that when light passes through the first lens unit L1, the light has no extreme refraction on the boundary surface of each media to thereby suppress aberration and achieve good optical performance.

The second lens unit L2 of negative refractive power consists of two negative lenses and one positive lens. In the zoom lens in the refractive power arrangement in each Embodiment, the second lens unit L2 shoulders a large magnification-varying effect and has large negative refractive power, and therefore large aberration also occurs inside. Adopting the aforementioned lens structure allows good aberration correction while maintaining strong negative refractive power and achieves a high zoom ratio and high optical performance with a simple lens structure.

The third lens unit L3 with positive refractive power consists of one positive lens and one negative lens. This allows chromatic aberration generated by the positive lens to be canceled by the negative lens, achieving good optical performance with a small number of lenses.

The fourth lens unit L4 of positive refractive power consists of at least one positive lens and one negative lens, including one or more aspherical surfaces. In this way, by canceling various types of aberration generated by the positive lens with the negative lens and combining this with the effective aspherical surface effect, good optical performance is obtained with a small number of lenses.

Furthermore, each Embodiment changes the distance between the third lens unit L3 and fourth lens unit L4 during zooming so that an off-axis luminous flux emerged from the third lens unit L3 passes through the fourth lens unit L4 at heights differing from one zoom position to another during zooming from the wide-angle side to the telephoto side. This allows the aspherical surface placed for the fourth lens unit L4 to efficiently function to perform good aberration correction over the entire zoom range from the wide-angle side to the telephoto side. At this time, it is more effective to provide the aspherical surface as the most image side surface of the fourth lens unit L4.

The material of the lens including the aspherical surface is not particularly limited, but it is desirable to use a lens made of resin from the aspect of manufacturing because it has a merit of allowing manufacturing with relative ease. Based on such an intention, Numerical Examples 1 and 2 use polycarbonate as the material of the lens having the aspherical surface.

Of course, the material for the aspherical lens may also be glass or a so-called composite aspherical surface lens having a resin layer with an aspherical surface placed on a glass substrate.

Furthermore, the zoom lens according to the present embodiment satisfies the following conditional expressions:

$$0.1 < f4/f3 < 0.9 \tag{1}$$

$$2.0 < f1/fw < 5.0 \tag{2}$$

where fi represents the focal length of the i-th lens unit and fw represents the focal length of the entire system at the wide-angle end.

When the refractive power of the third lens unit L3 increases beyond the upper limit of the range of this conditional expression (1), it is more difficult to correct various types of aberration generated with a small number of lenses and it is difficult to maintain good optical performance.

When the refractive power of the third lens unit L3 decreases beyond the lower limit, the amount of movement during zooming from the wide-angle end to the telephoto end increases and the outer diameter of the lens of the fourth lens unit L4 increases and it is more difficult to realize compactness.

Furthermore, as shown in the range of the conditional expression (1), by adopting a structure with stronger refractive power provided for the fourth lens unit L4, the tendency to increase refractive power of a so-called retro-focus at the wide-angle end becomes stronger providing a structure advantageous for widening the angle of view. Then, during zooming, the fourth lens unit L4 whose amount of movement can be relatively easily increased can shoulder a large part of the variation of magnification, and thereby achieve a high zoom ratio with a compact structure as a whole.

The conditional expression (2) is intended to keep the compactness of the entire optical system and the optical performance well balanced. When the refractive power of the first lens unit L1 decreases beyond the upper limit of the range of this conditional expression (2), a greater amount of movement of the first lens unit L1 is required with respect to a desired zoom ratio, and it is more difficult to reduce the size of the optical system. On the other hand, when the refractive power of the first lens unit L1 increases beyond the lower limit, it is difficult to correct aberration generated during zooming.

To achieve well-balanced good optical performance, it is desirable to set numerical values of the conditional expressions (1) and (2) as follows:

$$0.25 < f4/f3 < 0.5 \tag{1a}$$

$$3.0 < f1/fw < 4.0 \tag{2a}$$

Furthermore, the zoom lens of the present embodiment satisfies the following conditional expression:

$$0.15 < f4/f1 < 0.8 \tag{3}$$

where fi represents the focal length of the second lens unit L2.

The conditional expression (3) is the condition to balance the magnification-varying effect and optical performance and compactness of the optical system. When the refractive power of the fourth lens unit L4 relatively decreases beyond the upper limit and the refractive power of the first lens unit L1 relatively increases, it is more difficult for the first lens unit L1 having a two-lens-element structure to correct aberration generated by zooming, which is not desirable. On the other hand, when the refractive power of the fourth lens unit L4 relatively increases beyond the lower limit and the refractive power of the first lens unit L1 relatively decreases, the amount of movement of the first lens unit L1 during zooming increases, which is against the miniaturization of the optical system and it is also difficult to correct aberration generated in the fourth lens unit L4, which is not desirable.

Furthermore, to obtain a well-balanced and better condition, it is desirable to set the numerical range of the conditional expression (3) as follows:

$$0.25 < f4/f1 < 0.5 \tag{3a}$$

The zoom lens of the present embodiment adjusts the focal position when an object distance changes from infinity to a short distance by moving the second lens unit L2 on the optical axis. Adjusting the focal position by moving the first lens unit L1 requires the outer diameter of the first lens unit L1 to secure the amount of light around an image area at the wide-angle end, which is disadvantageous for miniaturization. By adjusting the focal position using the second lens L2, it is possible to obtain good optical performance from infinity to the minimum object distance without increasing the size of the optical system.

The second lens unit L2 is also moving on the optical axis during zooming, but the second lens unit L2 can also be fixed during zooming. In that case, the moving mechanism of the second lens unit L2 does not require two systems; for zooming and for focusing, but can be constructed of only a focusing mechanism, and therefore it is possible to simplify the mechanical structure and control system, providing a simpler structure.

In Embodiment 3, the fourth lens unit L4 consists of three lenses; two positive lenses and one negative lens, of which one of the positive lenses has an aspherical surface.

Constructing the fourth lens unit L4 of relatively strong positive refractive power using two positive lenses and one negative lens makes it possible to stably produce the effect of correcting a variation of the image plane caused by a variation of magnification and optimally correct aberration generated in the fourth lens unit L4 as well.

In Embodiment 4, the zoom lens is constituted, in order from the object side, of a first lens unit L1 of positive refractive power, a second lens unit L2 of negative refractive power, an aperture stop SP, a third lens unit L3 of positive refractive power, a fourth lens unit L4 of positive refractive power and a fifth lens unit L5 of substantially no refractive power.

During zooming, the first lens unit L1, third lens unit L3 and fourth lens unit L4 move toward the object side on the optical axis so that the distance between the first lens unit L1 and second lens unit L2 increases, the distance between the second lens L2 and third lens unit L3 decreases and the distance between the third lens unit L3 and fourth lens unit L4 decreases at the telephoto end compared to the wide-angle end, and the second lens unit L2 also moves on the optical axis. The fifth lens unit L5 is fixed during zooming.

When a resin aspherical lens is placed on the most image side of the fourth lens unit L4, if this is, for example, of a detachable type such as an interchangeable lens for a single-lens reflex camera, the resin lens which has low resistance against scars, etc. than a normal glass material is exposed to the outside. In that case, it is also possible to place a cover glass as the fifth lens unit L5 to protect the resin lens as in the case of Embodiment 4. Furthermore, when the zoom lens is used for a digital camera, it is also possible to place a wavelength selective filter, etc., at the same position or place optical path separating means for a plurality of image-pickup elements applicable to a video camera, etc.

In Embodiment 5, the zoom lens is constituted of a first lens unit L1 of positive refractive power, a second lens unit L2 of negative refractive power, an aperture stop SP, a third lens unit L3 of positive refractive power, a fourth lens unit L4 of positive refractive power and a fifth lens unit L5 of weak negative refractive power.

During zooming the first lens unit L1, third lens unit L3 and fourth lens unit L4 move toward the object side on the optical axis so that the distance between the first lens unit L1 and second lens unit L2 increases, the distance between the second lens L2 and third lens unit L3 decreases and the distance between the third lens unit L3 and fourth lens unit L4 decreases at the telephoto end compared to the wide-angle end, and the second lens unit L2 also moves on the optical axis. The fifth lens unit L5 is fixed during zooming.

In Embodiment 5, a resin (PMMA) aspherical lens is placed as the fifth lens unit L5. This allows various types of aberration to be corrected optimally, realizing an optical system with higher performance. Particularly, peripheral performance of an image on the telephoto end side, for example, astigmatism, which is difficult to correct by the aspherical surface placed on the fourth lens unit L4 which moves a great amount during zooming, can be well corrected.

As described above, each foregoing embodiment sets the lens structure of each lens unit appropriately in a zoom lens having four or five lens units, thereby achieves a wide angle of view with an image-taking angle of 60 degrees or more at the wide-angle end, achieves a zoom ratio of ×3 or above, and obtains a zoom lens with a simple structure while maintaining high optical performance over the entire zooming range.

Then, an embodiment of a single-lens reflex camera system using the zoom lens according to the present invention will be explained using FIG. 16. In FIG. 16, reference numeral 10 denotes a single-lens reflex camera body, 11 denotes an interchangeable lens incorporating the zoom lens of the present invention, 12 denotes a photosensitive plane of a silver haloid film or solid image-pickup element (photoelectric conversion element), etc., which records an object image acquired through the interchangeable lens 11, 13 denotes a finder optical system used to observe the object image from the interchangeable lens 11 and 14 denotes a revolving quick return mirror which switches to send the object image from the interchangeable lens 11 to the photosensitive plane 12 and the finder optical system 13. When the object image is observed through the finder, the object image formed on a focusing plate 15 through the quick return mirror 14 is changed to an erect image by a penta prism 16 and enlarged and observed by an eye piece optical system 17. When an image is taken, the quick return mirror 14 rotates in the direction indicated by the arrow and the object image is formed on the photosensitive plane 12.

In this way, by applying the zoom lens of the present invention to an optical apparatus such as an interchangeable lens for a single-lens reflex camera, it is possible to realize an optical apparatus with high optical performance.

Note that the present invention is likewise applicable to an SLR (Single lens Reflex) camera without any quick return mirror.

Then, Numerical Examples 1 to 5 corresponding to Embodiments 1 to 5 of the present invention will be shown. In the Numerical Examples, reference character i denotes a sequential order of a surface from the object side, Ri denotes a radius of curvature of the i-th surface, Di denotes the thickness of or air distance between the i-th and (i+1)-th optical member, Ni and vi denote a refractive index and Abbe's number for a d-line of the i-th optical member.

Furthermore, when R denotes the radius of curvature of the central area of the aspherical surface, X denotes displacement in the direction of the optical axis (light propagation direction) at the position of height Y from the optical axis with reference to the vertex of the surface, and B, C, D and E denote aspheric coefficients and K denotes a conic constant, X is expressed as:

$$X = \frac{(1/R)Y^2}{1+\sqrt{1-(1+K)(Y/R)^2}} + BY^4 + CY^6 + DY^8 + EY^{10}$$

Note that "e-x" represents "$\times 10^{-X}$". Furthermore, the relationship between part of the aforementioned conditional expression and numerical values in the Numerical Examples is shown in Table 1.

NUMERICAL EXAMPLE 1

| f = 28.90~101.34 Fno = 3.94~5.85 2ω = 73.6°~24.1° | | | |
|---|---|---|---|
| R1 = 54.954 | D1 = 7.56 | N1 = 1.696797 | v1 = 55.5 |
| R2 = −156.182 | D2 = 2.10 | N2 = 1.846660 | v2 = 23.9 |
| R3 = 491.197 | D3 = Variable | | |
| R4 = 186.820 | D4 = 1.40 | N3 = 1.743198 | v3 = 49.3 |
| R5 = 14.409 | D5 = 5.33 | | |
| R6 = −55.736 | D6 = 1.10 | N4 = 1.712995 | v4 = 53.9 |
| R7 = 32.140 | D7 = 0.12 | | |
| R8 = 24.075 | D8 = 3.39 | N5 = 1.846660 | v5 = 23.9 |
| R9 = 589.610 | D9 = Variable | | |
| R10 = (Aperture Stop) | D10 = 0.40 | | |
| R11 = 36.407 | D11 = 2.41 | N6 = 1.696797 | v6 = 55.5 |
| R12 = −67.562 | D12 = 0.41 | | |
| R13 = −33.746 | D13 = 1.00 | N7 = 1.846660 | v7 = 23.9 |

-continued

| | f = 28.90~101.34 Fno = 3.94~5.85 2ω = 73.6°~24.1° | | | |
|---|---|---|---|---|
| R14 = −259.038 | D14 = Variable | | | |
| R15 = 18.494 | D15 = 4.31 | N8 = 1.487490 | ν8 = 70.2 | |
| R16 = −58.235 | D16 = 9.20 | | | |
| R17 = −26.938 | D17 = 1.80 | N9 = 1.583060 | ν9 = 30.2 | |
| *R18 = −46.439 | | | | |

| Focal Length Variable Spacing | 28.90 | 50.32 | 101.34 |
|---|---|---|---|
| D3 | 3.20 | 13.45 | 32.71 |
| D9 | 19.43 | 10.32 | 2.60 |
| D14 | 6.88 | 3.12 | 0.80 |

Aspheric Coefficient

Surface 18: K = 4.95456e+00  B = 6.51495e−05  C = 3.35704e−07  D = −6.10368e−10
E = 4.11143e−12

NUMERICAL EXAMPLE 2

| | f = 28.90~101.35 Fno = 3.97~5.88 2ω = 73.6°~24.1° | | |
|---|---|---|---|
| R1 = 53.916 | D1 = 8.19 | N1 = 1.638539 | ν1 = 55.4 |
| R2 = −125.371 | D2 = 2.10 | N2 = 1.846660 | ν2 = 23.9 |
| R3 = 1866.328 | D3 = Variable | | |
| R4 = 159.427 | D4 = 1.40 | N3 = 1.743198 | ν3 = 49.3 |
| R5 = 14.314 | D5 = 5.32 | | |
| R6 = −62.299 | D6 = 1.10 | N4 = 1.712995 | ν4 = 53.9 |
| R7 = 29.793 | D7 = 0.12 | | |
| R8 = 23.037 | D8 = 3.45 | N5 = 1.846660 | ν5 = 23.9 |
| R9 = 343.895 | D9 = Variable | | |
| R10 = (Aperture Stop) | D10 = 0.40 | | |
| R11 = 38.230 | D11 = 2.50 | N6 = 1.677900 | ν6 = 55.3 |
| R12 = −47.530 | D12 = 0.37 | | |
| R13 = −31.142 | D13 = 1.00 | N7 = 1.805181 | ν7 = 25.4 |
| R14 = −490.413 | D14 = Variable | | |
| R15 = 17.860 | D15 = 4.31 | N8 = 1.487490 | ν8 = 70.2 |
| R16 = −59.415 | D16 = 9.49 | | |
| R17 = −22.638 | D17 = 1.80 | N9 = 1.583060 | ν9 = 30.2 |
| *R18 = −37.897 | | | |

| Focal Length Variable Spacing | 28.90 | 50.37 | 101.35 |
|---|---|---|---|
| D3 | 3.14 | 11.78 | 33.89 |
| D9 | 18.66 | 9.28 | 2.61 |
| D14 | 8.13 | 4.09 | 0.81 |

Aspheric Coefficient

Surface 18: K = 0.00000e+00  B = 5.92079e−05  C = 3.34495e−07  D = −1.04846e−10
E = 0.00000e+00

NUMERICAL EXAMPLE 3

| | f = 28.88~101.47 Fno = 3.89~5.90 2ω = 73.7°~24.1° | | |
|---|---|---|---|
| R1 = 53.648 | D1 = 7.51 | N1 = 1.696797 | ν1 = 55.5 |
| R2 = −227.992 | D2 = 2.10 | N2 = 1.846660 | ν2 = 23.9 |
| R3 = 302.111 | D3 = Variable | | |
| R4 = 182.383 | D4 = 1.40 | N3 = 1.743997 | ν3 = 44.8 |
| R5 = 14.968 | D5 = 5.72 | | |
| R6 = −59.150 | D6 = 1.10 | N4 = 1.712995 | ν4 = 53.9 |

-continued f = 28.88~101.47 Fno = 3.89~5.90 2ω = 73.7°~24.1°

| | | | |
|---|---|---|---|
| R7 = 32.128 | D7 = 0.12 | | |
| R8 = 24.711 | D8 = 3.32 | N5 = 1.846660 | ν5 = 23.9 |
| R9 = 1538.693 | D9 = Variable | | |
| R10 = (Aperture Stop) | D10 = 0.40 | | |
| R11 = 25.829 | D11 = 2.37 | N6 = 1.772499 | ν6 = 49.6 |
| R12 = −62.114 | D12 = 1.44 | | |
| R13 = −30.520 | D13 = 1.00 | N7 = 1.805181 | ν7 = 25.4 |
| R14 = 79.416 | D14 = Variable | | |
| R15 = 22.645 | D15 = 3.11 | N8 = 1.516330 | ν8 = 64.1 |
| R16 = −39.439 | D16 = 5.64 | | |
| R17 = 82.961 | D17 = 2.40 | N9 = 1.491710 | ν9 = 57.4 |
| *R18 = −65.962 | D18 = 0.30 | | |
| R19 = −215.819 | D19 = 1.20 | N10 = 1.677900 | ν10 = 55.3 |
| R20 = 32.107 | | | |

| Focal Length | 28.88 | 50.02 | 101.38 |
|---|---|---|---|
| Variable Spacing | | | |
| D3 | 3.33 | 16.98 | 33.36 |
| D9 | 21.87 | 12.14 | 2.50 |
| D14 | 4.93 | 2.62 | 0.85 |

Aspheric Coefficient

Surface 18:  K = 0.00000e+00  B = 7.66719e−05  C = 2.37428e−07  D = 1.94791e−10
E = 0.00000e+00

NUMERICAL EXAMPLE 4 f = 28.90~101.35 Fno = 3.95~5.85 2ω = 73.6°~24.1°

| | | | |
|---|---|---|---|
| R1 = 55.383 | D1 = 7.43 | N1 = 1.696797 | ν1 = 55.5 |
| R2 = −157.062 | D2 = 1.80 | N2 = 1.846660 | ν2 = 23.9 |
| R3 = 496.755 | D3 = Variable | | |
| R4 = 204.758 | D4 = 1.40 | N3 = 1.743198 | ν3 = 49.3 |
| R5 = 14.813 | D5 = 5.47 | | |
| R6 = −57.982 | D6 = 1.10 | N4 = 1.712995 | ν4 = 53.9 |
| R7 = 30.458 | D7 = 0.12 | | |
| R8 = 23.898 | D8 = 3.39 | N5 = 1.846660 | ν5 = 23.9 |
| R9 = 507.665 | D9 = Variable | | |
| R10 = (Aperture Stop) | D10 = 0.40 | | |
| R11 = 36.033 | D11 = 2.42 | N6 = 1.696797 | ν6 = 55.5 |
| R12 = −66.055 | D12 = 0.42 | | |
| R13 = −33.405 | D13 = 1.00 | N7 = 1.846660 | ν7 = 23.9 |
| R14 = −258.920 | D14 = Variable | | |
| R15 = 18.494 | D15 = 3.74 | N8 = 1.487490 | ν8 = 70.2 |
| R16 = −61.289 | D16 = 9.58 | | |
| R17 = −27.490 | D17 = 1.80 | N9 = 1.583060 | ν9 = 30.2 |
| *R18 = −47.017 | D18 = Variable | | |
| R19 = ∞ | D19 = 1.00 | N10 = 1.516330 | ν10 = 64.1 |
| R20 = ∞ | | | |

| Focal Length | 28.90 | 50.07 | 101.35 |
|---|---|---|---|
| Variable Spacing | | | |
| D3 | 3.39 | 13.42 | 33.36 |
| D9 | 19.23 | 10.24 | 2.62 |
| D14 | 7.25 | 3.27 | 0.79 |
| D18 | 0.83 | 13.15 | 25.24 |

Aspheric Coefficient

Surface 18:  K = −2.18133e+00  B = 5.67081e−05  C = 3.13412e−07  D = −4.03611e−10
E = 2.29649e−12

NUMERICAL EXAMPLE 5

| f = 28.90~101.35 Fno = 3.90~5.85 2ω = 73.6°~24.1° | | | |
|---|---|---|---|
| R1 = 57.941 | D1 = 7.43 | N1 = 1.696797 | ν1 = 55.5 |
| R2 = −166.114 | D2 = 1.80 | N2 = 1.846660 | ν2 = 23.9 |
| R3 = 436.908 | D3 = Variable | | |
| R4 = 183.345 | D4 = 1.40 | N3 = 1.743198 | ν3 = 49.3 |
| R5 = 14.866 | D5 = 5.68 | | |
| R6 = −57.304 | D6 = 1.10 | N4 = 1.712995 | ν4 = 53.9 |
| R7 = 30.170 | D7 = 0.12 | | |
| R8 = 24.075 | D8 = 3.39 | N5 = 1.846660 | ν5 = 23.9 |
| R9 = 479.140 | D9 = Variable | | |
| R10 = (Aperture Stop) | D10 = 0.40 | | |
| R11 = 35.550 | D11 = 2.42 | N6 = 1.696797 | ν6 = 55.5 |
| R12 = −58.869 | D12 = 0.41 | | |
| R13 = −33.069 | D13 = 1.00 | N7 = 1.846660 | ν7 = 23.9 |
| R14 = −243.194 | D14 = Variable | | |
| R15 = 18.423 | D15 = 3.74 | N8 = 1.487490 | ν8 = 70.2 |
| R16 = −63.379 | D16 = 9.49 | | |
| R17 = −29.726 | D17 = 1.80 | N9 = 1.583060 | ν9 = 30.2 |
| *R18 = −50.337 | D18 = Variable | | |
| R19 = −259.166 | D19 = 1.50 | N10 = 1.491710 | ν10 = 57.4 |
| *R20 = 428.319 | | | |

| Focal Length Variable Spacing | 28.90 | 50.03 | 101.35 |
|---|---|---|---|
| D3 | 3.19 | 13.49 | 35.16 |
| D9 | 19.66 | 9.96 | 2.74 |
| D14 | 7.33 | 3.57 | 0.58 |
| D18 | 0.59 | 12.07 | 23.81 |

Aspheric Coefficient

Surface 18: K = −2.17667e+00  B = 6.08145e−05  C = 2.91400e−07  D = 7.21778e−10
E = −6.40744e−12
Surface 20: K = −1.40841e+03  B = 3.34051e−06  C = −1.14059e−08  D = 3.97146e−12
E = 3.81791e−14

TABLE 1

| Conditional Expression | Numerical Example | | | | |
|---|---|---|---|---|---|
| | 1 | 2 | 3 | 4 | 5 |
| (1) f4/f3 | 0.290 | 0.293 | 0.312 | 0.298 | 0.347 |
| (2) f1/fw | 3.402 | 3.509 | 3.545 | 3.430 | 3.698 |
| (3) f4/f1 | 0.360 | 0.347 | 0.335 | 0.359 | 0.329 |

What is claimed is:

1. A zoom lens system comprising, in order from an object side to an image side:
   a first lens unit of positive optical power, the first lens unit consisting of one positive lens element and one negative lens element in order from the object side to the image side;
   a second lens unit of negative optical power, the second lens unit consisting of two negative lens elements and one positive lens element;
   a third lens unit of positive optical power, the third lens unit consisting of one positive lens element and one negative lens element; and
   a fourth lens unit of positive optical power, the fourth lens unit comprising one positive lens element and one negative lens element,
   wherein at least the first, third and fourth lens units move during zooming so that the distance between the first lens unit and second lens unit increases, the distance between the second lens unit and third lens unit decreases and the distance between the third lens unit and fourth lens unit decreases at a telephoto end compared to a wide-angle end,
   at least one aspherical surface is provided on the fourth lens unit or a lens unit on the image side thereof, and the zoom lens satisfies the following conditions:

$0.1 < f4/f3 < 0.9$ $2.0 < f1/fw < 5.0$ where fi represents a focal length of an i-th lens unit and fw represents a focal length of the entire system at the wide-angle end.

2. The zoom lens system according to claim 1, wherein the positive lens element and negative lens element constituting the first lens unit are a positive lens element having a biconvex shape and a negative lens element having a biconcave shape, respectively.

3. The zoom lens system according to claim 1, satisfying the following condition:

$0.15 < f4/f1 < 0.8$.

4. The zoom lens system according to claim 1, wherein focusing is performed by moving the second lens unit along an optical axis.

5. The zoom lens system according to claim 1, wherein the fourth lens unit consists of one positive lens element and one negative lens element, and
   the fourth lens unit has an aspherical surface.

6. The zoom lens system according to claim 1, wherein the fourth lens unit consists of two positive lens elements and one negative lens element, and
the fourth lens unit has an aspherical surface.

7. The zoom lens system according to claim 1, wherein the zoom lens system forms an image on a solid image-pickup element.

8. A camera comprising:

the zoom lens system according to claim 1; and a solid image-pickup element which receives an image formed by the zoom lens system.

* * * * *